US012803009B2

(12) United States Patent
Yano et al.

(10) Patent No.: US 12,803,009 B2
(45) Date of Patent: Nov. 17, 2026

(54) STAINLESS STEEL SHEET FOR FUEL CELL SEPARATORS

(71) Applicant: JFE STEEL CORPORATION, Tokyo (JP)

(72) Inventors: Takayoshi Yano, Tokyo (JP); Akito Mizutani, Tokyo (JP); Kazuhiko Ikeda, Ashigarakami-gun (JP); Tomoko Fujii, Ashigarakami-gun (JP); Hiroshi Matsunaga, Ashigarakami-gun (JP)

(73) Assignee: JFE STEEL CORPORATION, Tokyo (JP)

( * ) Notice: Subject to any disclaimer, the term of this patent is extended or adjusted under 35 U.S.C. 154(b) by 639 days.

(21) Appl. No.: 18/255,740

(22) PCT Filed: Dec. 13, 2021

(86) PCT No.: PCT/JP2021/045803
§ 371 (c)(1),
(2) Date: Jun. 2, 2023

(87) PCT Pub. No.: WO2022/131204
PCT Pub. Date: Jun. 23, 2022

(65) Prior Publication Data

US 2024/0006621 A1 Jan. 4, 2024

(30) Foreign Application Priority Data

Dec. 15, 2020 (JP) ................................ 2020-207212

(51) Int. Cl.
*H01M 8/021* (2016.01)
*C22C 38/02* (2006.01)
(Continued)

(52) U.S. Cl.
CPC ............ *H01M 8/021* (2013.01); *C22C 38/02* (2013.01); *C22C 38/06* (2013.01); *C22C 38/58* (2013.01)

(58) Field of Classification Search
CPC .......... C22C 38/02; C22C 38/06; C22C 38/58
See application file for complete search history.

(56) References Cited

U.S. PATENT DOCUMENTS 4,579,606 A 4/1986 Mizunuma et al.
6,229,255 B1 5/2001 Kim et al.
(Continued)

FOREIGN PATENT DOCUMENTS

CN 104981931 A 10/2015
EP 4245877 A1 9/2023
(Continued)

OTHER PUBLICATIONS

Feb. 22, 2025, Office Action issued by the Korean Intellectual Property Office in the corresponding Korean Patent Application No. 10-2023-7023845 with English language concise statement of relevance.
(Continued)

*Primary Examiner* — Karie O'Neill Apicella
(74) *Attorney, Agent, or Firm* — KENJA IP LAW PC

(57) ABSTRACT

It is provided a stainless steel sheet for fuel cell separators with low contact resistance, which can be produced very advantageously in terms of safety as well as mass production. A parameter Sa specified in ISO 25178 is set to 0.15 μm or more and 0.50 μm or less, and a parameter Ssk specified in ISO 25178 is set to more than 0.

5 Claims, 3 Drawing Sheets

(51) Int. Cl.
*C22C 38/06* (2006.01)
*C22C 38/58* (2006.01)

(56) References Cited

U.S. PATENT DOCUMENTS

| | | | | |
|---|---|---|---|---|
| 9,587,297 | B2 | 3/2017 | Ishii et al. | |
| 2011/0294042 | A1* | 12/2011 | Kim | C22C 38/004 148/269 |
| 2014/0154129 | A1 | 6/2014 | Makiishi et al. | |
| 2014/0272668 | A1 | 9/2014 | Nagoshi et al. | |
| 2015/0280251 | A1* | 10/2015 | Takahashi | C22C 14/00 429/509 |
| 2020/0248332 | A1 | 8/2020 | Yano et al. | |
| 2020/0280075 | A1* | 9/2020 | Kim | C22C 38/48 |
| 2022/0085388 | A1 | 3/2022 | Yano et al. | |

FOREIGN PATENT DOCUMENTS

| | | | |
|---|---|---|---|
| JP | H08180883 | A | 7/1996 |
| JP | 2002367622 | A | 12/2002 |
| JP | 2004216242 | A | 8/2004 |
| JP | 2005089800 | A | 4/2005 |
| JP | 2005302713 | A | 10/2005 |
| JP | 2011038166 | A | 2/2011 |
| JP | 2013093299 | A | 5/2013 |
| JP | 5218612 | B2 | 6/2013 |
| JP | 5768641 | B2 | 8/2015 |
| JP | 2019035106 | A | 3/2019 |
| JP | 2020152949 | A | 9/2020 |
| WO | 2013080533 | A1 | 6/2013 |
| WO | 2019082591 | A1 | 5/2019 |
| WO | 2020153117 | A1 | 7/2020 |

OTHER PUBLICATIONS

Feb. 8, 2022, International Search Report issued in the International Patent Application No. PCT/JP2021/045803.

Oct. 18, 2022, Notification of Reasons for Refusal issued by the Japan Patent Office in the corresponding Japanese Patent Application No. 2022-511392 with English language Concise Statement of Relevance.

Apr. 30, 2024, the Extended European Search Report issued by the European Patent Office in the corresponding European Patent Application No. 21906566.1.

Mar. 31, 2026, Office Action issued by the China National Intellectual Property Administration in the corresponding Chinese Patent Application No. 202180084000.2 with English language search report.

* cited by examiner

STAINLESS STEEL SHEET FOR FUEL CELL SEPARATORS

TECHNICAL FIELD

This disclosure relates to a stainless steel sheet for fuel cell separators.

BACKGROUND

In recent years, fuel cells that have excellent power generation efficiency and emit no $CO_2$ are being developed for global environment protection. The fuel cells generate electricity from hydrogen and oxygen through an electrochemical reaction. The fuel cells have sandwich-like basic structures and include an electrolyte membrane (ion-exchange membrane), two electrodes (fuel electrode and air electrode), diffusion layers for $O_2$ (air) and $H_2$, and two separators (Bipolar plates).

The fuel cells are classified into phosphoric acid fuel cells, molten carbonate fuel cells, solid oxide fuel cells, alkaline fuel cells, and proton-exchange membrane fuel cells or polymer electrolyte fuel cells (PEFC), according to the type of electrolyte membrane to be used, which are each being developed.

Of these fuel cells, the polymer electrolyte fuel cells are particularly expected to be used as power sources in electric vehicles, home or industrial stationary generators, and portable small generators.

The polymer electrolyte fuel cell extracts electricity from hydrogen and oxygen via a polymer membrane. In the polymer electrolyte fuel cell, a membrane-electrode joined body is sandwiched by gas diffusion layers (e.g., carbon papers) and separators to form a single component (so-called single cell). Then, an electromotive force is generated between the separator on the side of the fuel electrode and the separator on the side of the air electrode. The above membrane-electrode joined body is called a membrane-electrode assembly (MEA), which integrates a polymer membrane and electrode materials such as carbon black with a platinum-based catalyst loaded on the front and back surfaces of the membrane. The above membrane-electrode joined body has a thickness of several 10 μm to several 100 μm. The gas diffusion layers are often integrated with the membrane-electrode joined body.

In actual use of the polymer electrolyte fuel cells, tens to hundreds of single cells as described above are typically connected in series to form a fuel cell stack for use. Here, the separators are required to function not only as (a) partition walls that separate the single cells, but also as (b) conductors that carry generated electrons, (c) air passages through which oxygen (air) flows and hydrogen passages through which hydrogen flows, and (d) exhaust passages through which generated water or gas is exhausted (the air passages and the hydrogen passages al so serve as the exhaust passages). Thus, the separators need to have excellent durability and electric conductivity.

Of these, the durability is determined by corrosion resistance. The reason is that elution of metal ions due to separator corrosion decreases the proton conductivity of the polymer membrane (electrolyte membrane) to decrease power generation performance.

Regarding the electric conductivity (conductivity), the contact resistance between the separator and the gas diffusion layer is desirably as low as possible. The reason is that an increase in the contact resistance between the separator and the gas diffusion layer decreases power generation efficiency of the polymer electrolyte fuel cell. That is, a lower contact resistance between the separator and the gas diffusion layer contributes to better power generation performance.

Polymer electrolyte fuel cells using graphite as separators have already been in practical use. The separators made of graphite are advantageous in that the contact resistance is relatively low and also corrosion does not occur. However, the separators made of graphite are disadvantageous in being likely to be damaged by impact. In addition, the separators made of graphite are disadvantageous not only in that size reduction is difficult, but also in that processing cost for forming the air passages and the hydrogen passages is high. These disadvantages associated with the separators made of graphite prevent the widespread use of the polymer electrolyte fuel cells.

Therefore, attempts have been made to apply a metal material as the separator material instead of graphite. In particular, various studies have been conducted to commercialize separators made of stainless steel, titanium, a titanium alloy, or the like, from the viewpoint of enhancing the durability.

For example, PTL 1 discloses a technique of using, as separators, a metal such as stainless steel or a titanium alloy that easily forms a passive film. However, the technique disclosed in PTL 1 causes an increase in contact resistance due to the formation of the passive film. This results in a decrease in power generation efficiency. The metal material disclosed in PTL 1 thus has problems such as high contact resistance as compared with the graphite material.

Therefore, in order to reduce the contact resistance, for example, PTL 2 discloses:

a "ferritic stainless steel excellent in corrosion resistance and electric conductivity, the ferritic stainless steel containing, by mass %, C: % or more and 0.05% or less, Si: 0.001% or more and 0.5% or less, Mn: 0.001% or more and 1.0% or less, Al: 0.001% or more and % or less, N: 0.001% or more and 0.05% or less, Cr: 17% or more and 23% or less, Mo: 0.1% or less and the balance being Fe and inevitable impurities, and the ferritic stainless steel having a film on the surface of the stainless steel, said film is obtained by immersing the stainless steel in a solution for an immersion treatment, said solution mainly contains hydrofluoric acid or nitric hydrofluoric acid, and in said solution the relationship represented by the following expression [1] is satisfied, where [HF] denotes the concentration of hydrofluoric acid and [$HNO_3$] denotes the concentration of nitric acid:

$$[HF] \geq [HNO_3] \qquad [1]".$$

PTL 3 discloses:

a "method of producing a stainless steel for fuel cell separators, comprising: subjecting stainless steel containing 16 mass % or more Cr to electrolysis; and then immersing the stainless steel in a fluorine-containing solution".

Furthermore, PTL 4 discloses:

a "stainless steel for fuel cell separators wherein the stainless steel contains, by mass, C: 0.03% or less, Si: 1.0% or less, Mn: 1.0% or less, S: 0.01% or less, P: 0.05% or less, Al: 0.20% or less, N: 0.03% or less, Cr: 16% or more and 40% or less, and one or more of Ni: 20% or less, Cu: 0.6% or less and Mo: 2.5% or less, the balance being Fe and inevitable impurities, and wherein according to photoelectron spectroscopy, the surface of the stainless steel contains fluorine and satisfies the following relation: chemical form other than metal (Cr+Fe)/metal form (Cr+Fe)≥3.0".

In addition, PTL 5 discloses:

a "stainless steel having a low surface contact resistance for fuel cell separators and a Cr content in the range of 16 mass % to 40 mass %, wherein the stainless steel includes a region having a fine textured structure on its surface, the area percentage of the region being 50% or more".

CITATION LIST

Patent Literature

PTL 1: JPH08180883A
PTL 2: JP5768641B2
PTL 3: JP2013093299A
PTL 4: JP5218612B2
PTL 5: WO2013080533A
PTL 6: WO2019082591A

SUMMARY

Technical Problem

However, when immersion treatment in a treatment solution containing hydrofluoric acid is continuously performed as etching treatment to produce the stainless steel sheets disclosed in PTLs 2 to 5, Fe ions, etc. elute from steel sheets as treated material. This might result in a decrease in etching ability of hydrofluoric acid to fail to stably obtain the desired contact resistance reduction effect. In addition, the treatment solution containing hydrofluoric acid is chemically extremely active, which causes a safety problem during treatment operation. The disposal of waste liquid discharged after the treatment operation also causes a safety problem.

Therefore, we have studied to solve the above problems, and previously disclosed, in PTL 6, a "method of producing a stainless steel sheet for fuel cell separators, the method comprising:
preparing a stainless steel sheet as a material;
thereafter removing an oxide layer at a surface of the stainless steel sheet; and
thereafter subjecting the stainless steel sheet to electrolytic etching treatment in an active region of the stainless steel sheet".

The above technique in PTL 6 has made it possible to advantageously in terms of safety and stably produce stainless steel sheets for fuel cell separators, which can obtain low contact resistance, without using the treatment solution containing hydrofluoric acid.

However, the above technique in PTL 6 applies the electrolytic etching treatment, which requires a huge electrolytic apparatus for mass production and a high equipment cost. In addition, when the electrolytic etching treatment is applied after press working on stainless steel sheets, it is necessary to attach electrodes to the press-worked products, which is burdensome.

This disclosure was developed to solve the above problems. It could be helpful to provide a stainless steel sheet for fuel cell separators with low contact resistance, which can be produced very advantageously in terms of safety as well as mass production.

Solution to Problem

We engaged in intensive studies on the above problems and obtained the following insights.

(1) First, from the viewpoint of improving mass productivity, we subjected various stainless steel sheets to various etching treatments and measured the contact resistance of the treated stainless steel sheets. Specifically, instead of the electrolytic etching treatment as in PTL 6, we applied an etching treatment in which stainless steel sheets are immersed in various treatment solutions (hereinafter, also referred to as a first immersion treatment) and then measured the contact resistance of the treated stainless steel sheets.

(2) As a result, we found that sufficient contact resistance reduction effect can be obtained without electrolytic etching treatment or hydrofluoric acid etching treatment by:

as the first immersion treatment, using an acidic aqueous solution containing hydrogen peroxide, copper ions, and halide ions, as the treatment solution, and applying immersion treatment with a treatment temperature of 30° C. to 50° C. and a treatment time of 40 seconds to 120 seconds, respectively, and after the first immersion treatment, as a second immersion treatment, applying one of the following treatments (A) to (C).

(A) Immersion treatment using an acidic aqueous solution containing hydrogen peroxide, with a treatment temperature of 30° C. to 60° C. and a treatment time of 5 seconds to 120 seconds, respectively (B) Immersion treatment using an aqueous solution containing nitric acid, with a treatment temperature of 30° C. to 60° C. and a treatment time of 5 seconds to 120 seconds, respectively (C) Treatment combining (A) and (B) above (3) In addition, we used a laser microscope to check the surface characteristics of the stainless steel sheet after the above immersion treatment (hereinafter, referred to as a stainless steel sheet of this disclosure), and found that recessed parts and sharp-tipped projected parts as illustrated in FIG. 1 were formed on the surface of the stainless steel sheet of this disclosure.

(4) Based on this point, we further studied and found that sufficient contact resistance reduction effect was obtained by setting a parameter Sa specified in ISO 25178 to 0.15 μm or more and 0.50 μm or less, and preferably 0.20 μm or more and 0.48 μm or less, and setting a parameter Ssk specified in ISO 25178 to more than 0. Here, the parameter Sa specified in ISO 25178 is one of surface roughness parameters and represents an arithmetic mean height. The arithmetic mean height is the mean of the absolute values of difference in height of respective points relative to the mean plane of the surface and is a parameter commonly used in evaluating surface roughness. The parameter Ssk (skewness) specified in ISO 25178 is also one of surface roughness parameters and represents the symmetry of height distribution. As illustrated in FIG. 2, a positive value (more than 0) for Ssk (skewness) indicates that the tips (upper ends) of the projected parts (mountains) are sharp and the tips (lower ends) of the recessed parts (valleys) are wide (close to flat). On the other hand, a negative value (less than 0) for Ssk indicates that the tips (upper ends) of the projected parts (mountains) are wide (close to flat) and the tips (lower ends) of the recessed parts (valleys) are sharp.

(5) Here, we think that the mechanism by which the above contact resistance reduction effect is obtained is as follows.

That is, the fuel cell separator contacts the gas diffusion layer made of a carbon paper, a carbon cloth, or the like, with applying a predetermined load. In stainless steel sheets obtained by applying conventional electrolytic etching treatment or hydrofluoric acid etching treatment, many fine recessed and projected parts are formed on the surface of the steel sheet. These fine recessed and projected parts increase the contact area between the separator (stainless steel sheet) and the gas diffusion layer. This results in a decrease in contact resistance. On the other hand, as mentioned above, recessed parts and sharp-tipped projected parts are formed on the surface of the stainless steel sheet of this disclosure. Therefore, as illustrated in FIG. 3, when the separator (stainless steel sheet) contacts the gas diffusion layer, the tips of the projected parts formed on the surface of the stainless steel sheet of this disclosure pierce the carbon fiber of the gas diffusion layer. Then, these parts (where the tips of the projected parts pierce the carbon fiber of the gas diffusion layer) become current paths to decrease the contact resistance. That is, we think that the mechanism by which the contact resistance reduction effect is obtained in the stainless steel sheet of this disclosure is different from the mechanism by which the contact resistance reduction effect is obtained in stainless steel sheets obtained by conventional electrolytic etching treatment or hydrofluoric acid etching treatment.

In fact, when we measured the data of surface characteristics of the stainless steel sheet obtained by applying conventional electrolytic etching treatment or hydrofluoric acid etching treatment, Sa was less than 0.15 μm, or Ssk was a negative value (less than 0), which was clearly different from the surface characteristics of the stainless steel sheet of this disclosure.

(6) In addition, as the second immersion treatment, by performing (B) or (C) above to control [chemical form other than metal (Cr+Fe)]/[metal form (Cr+Fe)] to 8.0 or less, further contact resistance reduction effect can be obtained.

Here, [chemical form other than metal (Cr+Fe)]/[metal form (Cr+Fe)] is the ratio of the total Cr and Fe present in the chemical form other than metal to the total Cr and Fe present in the metal form on the steel sheet surface. Further, [metal form (Cr+Fe)] is a total atomic concentration of Cr and Fe present in the metal form, and [chemical form other than metal (Cr+Fe)] is a total atomic concentration of Cr and Fe present in the chemical form other than metal, which are measured when analyzing the steel sheet surface by X-ray photoelectron spectroscopy.

(7) We think that the reason for the above is as follows.

That is, as mentioned above, recessed parts and sharp-tipped projected parts are formed on the surface of the stainless steel sheet of this disclosure. Therefore, when the separator (stainless steel sheet) contacts the gas diffusion layer, the tips of the projected parts formed on the surface of the stainless steel sheet of this disclosure pierce the carbon fiber of the gas diffusion layer. Then, these parts (where the tips of the projected parts pierce the carbon fiber of the gas diffusion layer) become current paths to decrease the contact resistance. However, during etching by the first immersion treatment, a large amount of smut (a mixture of C, N, S, O, Fe, Cr, Ni, and Cu as major constituent elements) is generated and adheres to the steel sheet surface, as the steel sheet is dissolved. Because the smut has high electrical resistance, the steel sheet as subjected to the first immersion treatment (etching treatment) incurs an increase in contact resistance due to the effect of such smut. In this regard, as the second immersion treatment, performing (B) or (C) above, i.e., using an aqueous solution containing nitric acid as the treatment solution, makes it possible to particularly effectively remove the smut adhered to the steel sheet surface. The amount of smut on the steel sheet surface is correlated with [chemical form other than metal (Cr+Fe)]/[metal form (Cr+Fe)]. A lower [chemical form other than metal (Cr+Fe)]/[metal form (Cr+Fe)] means that the smut is sufficiently removed. Therefore, controlling [chemical form other than metal (Cr+Fe)]/[metal form (Cr+Fe)] to 8.0 or less further reduces the contact resistance.

(8) Furthermore, we studied the effect of the average grain size of the stainless steel sheet on the dissolution behavior during the first immersion treatment and found that the average grain size of the stainless steel sheet is preferably 10 μm or more and that the average grain size of the stainless steel sheet is preferably 40 μm or less.

This disclosure was completed based on the above insights and further studies.

That is, we provide:

1. A stainless steel sheet for fuel cell separators, having a parameter Sa specified in ISO 25178 of 0.15 μm or more and 0.50 μm or less and a parameter Ssk specified in ISO 25178 of more than 0.

2. The stainless steel sheet for fuel cell separators according to 1. above, wherein the parameter Sa specified in ISO 25178 is 0.20 μm or more and 0.48 μm or less.

3. The stainless steel sheet for fuel cell separators according to 1. or 2. above, wherein [chemical form other than metal (Cr+Fe)]/[metal form (Cr+Fe)] is 8.0 or less, where [chemical form other than metal (Cr+Fe)]/[metal form (Cr+Fe)] is the ratio of the total Cr and Fe present in the chemical form other than metal to the total Cr and Fe present in the metal form on the steel sheet surface.

4. The stainless steel sheet for fuel cell separators according to any one of 1. to 3. above, comprising a chemical composition containing (consisting of), by mass %, C: 0.100% or less;
Si: 2.00% or less;
Mn: 3.00% or less;
P: 0.050% or less;
S: 0.010% or less;
Cr: 15.0% or more and 25.0% or less;
Ni: 0.01% or more and 30.0% or less;
Al: 0.500% or less; and
N: 0.100% or less, with the balance being Fe and inevitable impurities.

5. The stainless steel sheet for fuel cell separators according to 4. above, wherein the chemical composition further contains, by mass %, one or two or more selected from the group consisting of Cu: 2.50% or less;
Mo: 4.00% or less; and
one or two or more elements selected from Ti, Nb, and Zr: 1.00% or less in total.

6. The stainless steel sheet for fuel cell separators according to any one of 1. to 5. above, wherein an average grain size is 10 μm or more and 40 μm or less.

Advantageous Effect

According to this disclosure, it is possible to obtain a stainless steel sheet for fuel cell separators with low contact resistance, which can be produced very advantageously in terms of safety as well as mass production.

DETAILED DESCRIPTION (1) Stainless Steel Sheet for Fuel Cell Separators

The following describes a stainless steel sheet for fuel cell separators according to one of the disclosed embodiments. As mentioned above, in the stainless steel sheet for fuel cell separators according to one of the embodiments, it is important to form a textured structure having recessed parts and projected parts on the surface to control the textured shape.

Parameter Sa Specified in ISO 25178: 0.15 μm or More and 0.50 μm or Less

Sa is one of surface roughness parameters specified in ISO 25178 and represents an arithmetic mean height. The arithmetic mean height is the mean of the absolute values of difference in height of respective points relative to the mean plane of the surface and is a parameter commonly used in evaluating surface roughness. As mentioned above, in the stainless steel sheet for fuel cell separators according to one of the embodiments, when a separator (stainless steel sheet) contacts a gas diffusion layer, the tips of the projected parts formed on the surface of the stainless steel sheet pierce the carbon fiber of the gas diffusion layer. Then, these parts (where the tips of the projected parts pierce the carbon fiber of the gas diffusion layer) become current paths to decrease the contact resistance. Therefore, it is necessary that the tips of the projected parts are sharp and that the tips of the projected parts sufficiently pierce the carbon fiber of the gas diffusion layer. Thus, Sa is 0.15 μm or more. Sa is preferably 0.20 μm or more. However, if Sa is more than 0.50 μm, the thickness of the stainless steel sheet becomes non-uniform by etching treatment. That is, etching locally progresses to make the stainless steel sheet thinner and more likely to fracture. Therefore, Sa is 0.50 μm or less. Sa is preferably 0.48 μm or less, more preferably 0.45 μm or less, and further preferably 0.40 μm or less.

Parameter Ssk (Skewness) Specified in ISO 25178: More than 0

Figure 1:
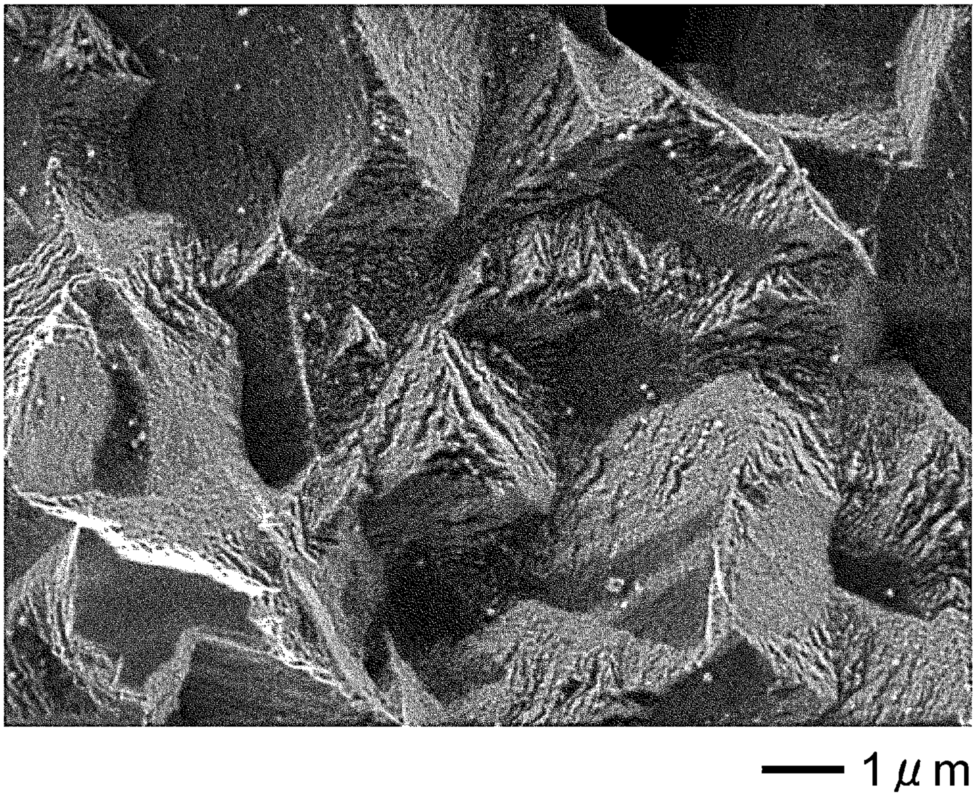
FIG. 1 is a photograph of the surface condition of a stainless steel sheet for fuel cell separators (Sample No. 6) according to one of the disclosed embodiment, observed with a laser microscope.
Figure 2:
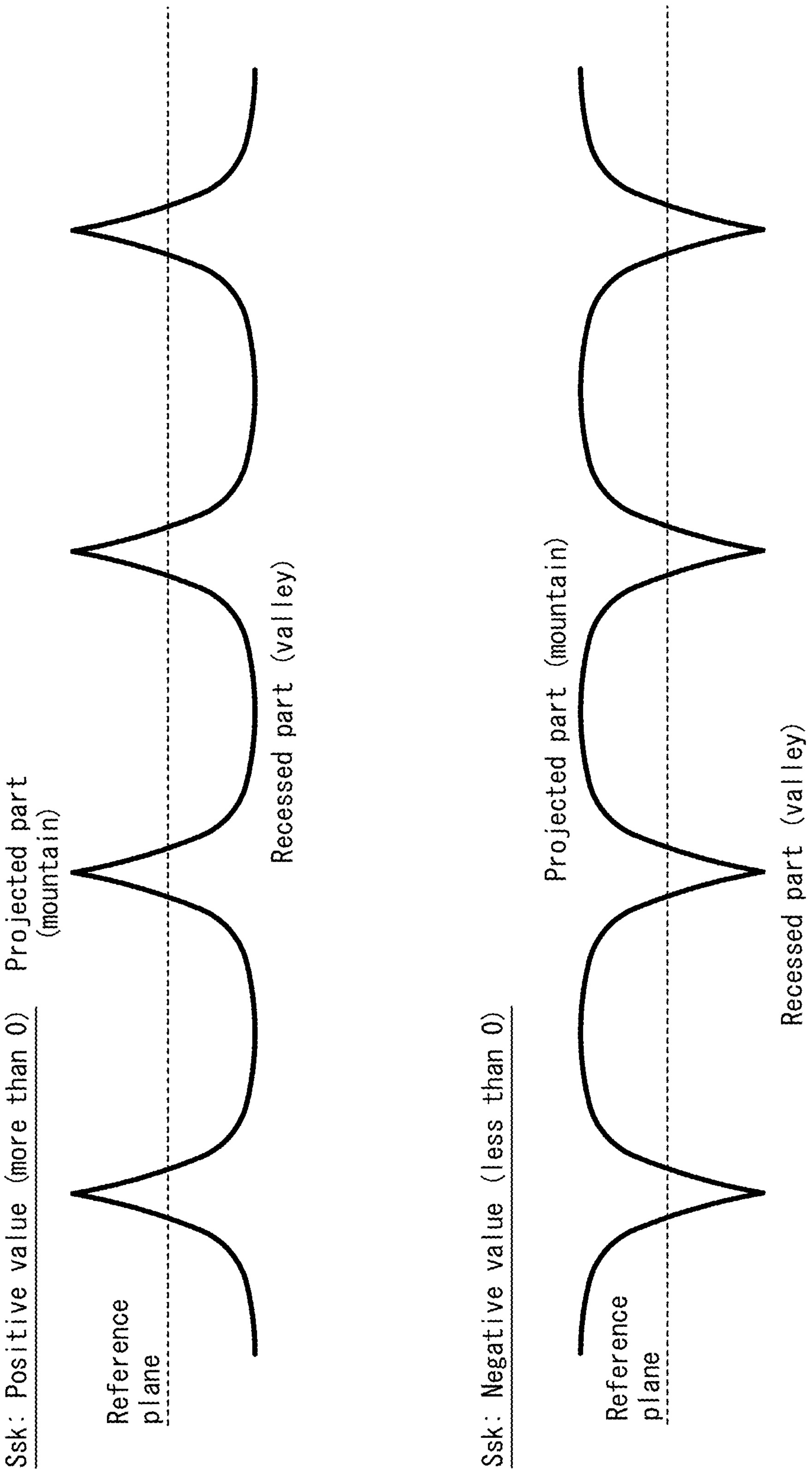
FIG. 2 is a schematic view (cross-sectional view) that illustrates the surface conditions for positive value (more than 0) and negative value (less than 0) for Ssk (skewness)
Figure 3:
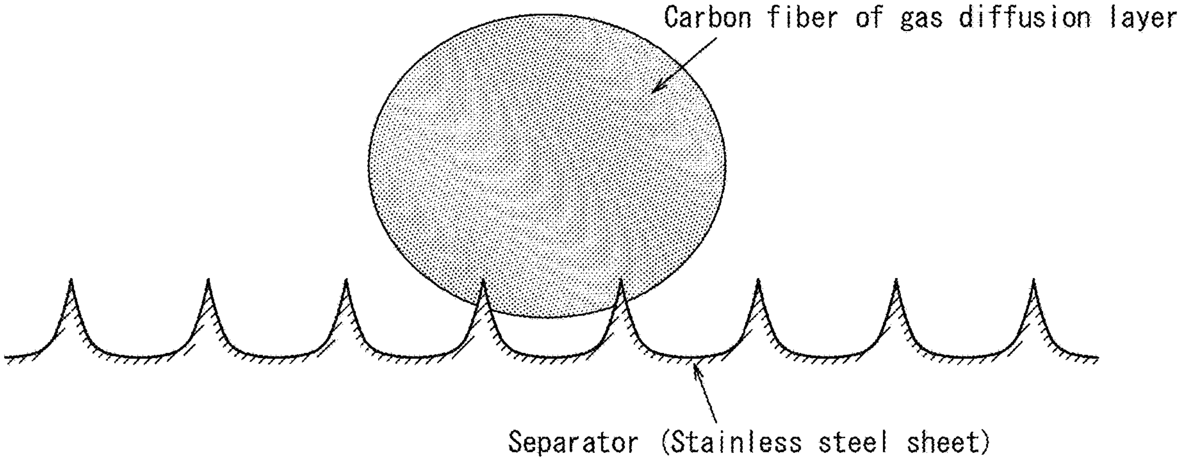
FIG. 3 is a schematic view (cross-sectional view) that illustrates the contact situation when a stainless steel sheet for fuel cell separators (separator) according to one of the embodiments contacts the carbon fiber of a gas diffusion layer.

A parameter Ssk (skewness) specified in ISO 25178 is one of surface roughness parameters and represents the symmetry of height distribution. As illustrated in FIG. 2, a positive value (more than 0) for Ssk (skewness) indicates that the tips (upper ends) of the projected parts (mountains) are sharp and the tips (lower ends) of the recessed parts (valleys) are wide (close to flat). On the other hand, a negative value (less than 0) for Ssk indicates that the tips (upper ends) of the projected parts (mountains) are wide (close to flat) and the tips (lower ends) of the recessed parts (valleys) are sharp. As mentioned above, in the stainless steel sheet for fuel cell separators according to one of the embodiments, when a separator (stainless steel sheet) contacts a gas diffusion layer, the tips of the projected parts formed on the surface of the stainless steel sheet pierce the carbon fiber of the gas diffusion layer. Then, these parts (where the tips of the projected parts pierce the carbon fiber of the gas diffusion layer) become current paths to decrease the contact resistance. Therefore, it is necessary that the tips of the projected parts formed on the surface of the stainless steel sheet are sharp. Therefore, Ssk is more than 0. Ssk is preferably 0.10 or more. No particular upper limit is placed on Ssk. However, Ssk is preferably 1.0 or less because an excessive increase in Ssk may result in a decrease in the number of projected parts, which in turn increases the contact resistance.

Sa and Ssk may be measured in accordance with ISO 25178. For example, a laser microscope may be used as a measurement device. In the stainless steel sheet for fuel cell separators according to one of the embodiments, Sa may be 0.15 μm or more and 0.50 μm or less, and Ssk may be more than 0, on at least one surface (surface on the side in contact with the gas diffusion layer). In a steel sheet produced through etching treatment described below, usually, Sa is 0.15 μm or more and 0.50 μm or less, and Ssk is more than 0, on both sides.

[Chemical Form Other than Metal (Cr+Fe)]/[Metal Form (Cr+Fe)]: 8.0 or Less

As mentioned above, controlling [chemical form other than metal (Cr+Fe)]/[metal form (Cr+Fe)] to 8.0 or less can further enhance the contact resistance reduction effect in a fuel cell separator use environment. Therefore, [chemical form other than metal (Cr+Fe)]/[metal form (Cr+Fe)] is preferably 8.0 or less. [chemical form other than metal (Cr+Fe)]/[metal form (Cr+Fe)] is preferably 7.0 or less, more preferably 6.0 or less, and further preferably 5.0 or less. If [chemical form other than metal (Cr+Fe)]/[metal form (Cr+Fe)] is more than 8.0, smut removal on the steel sheet surface is not sufficient and further contact resistance reduction effect is not obtained. No particular lower limit is placed on [chemical form other than metal (Cr+Fe)]/[metal form (Cr+Fe)]. However, [chemical form other than metal (Cr+Fe)]/[metal form (Cr+Fe)] is preferably 2.0 or more because an excessive reduction increases the treatment time. The chemical form other than metal denotes oxide and hydroxide. Specifically, Cr includes $CrO_2$, $Cr_2O_3$, CrOOH, $Cr(OH)_3$, and $CrO_3$. Fe includes FeO, $Fe_3O_4$, $Fe_2O_3$, and FeOOH.

Here, [chemical form other than metal (Cr+Fe)]/[metal form (Cr+Fe)] is determined as follows.

That is, the steel sheet surface is measured by X-ray photoelectron spectroscopy (hereinafter, also referred to as XPS), and the obtained Cr peaks are separated into peaks of Cr present in the metal form and peaks of Cr present in the chemical form other than metal. Similarly, the obtained Fe peaks are separated into peaks of Fe present in the metal form and peaks of Fe present in the chemical form other than metal. The sum of the atomic concentrations of Cr present in the chemical form other than metal and Fe present in the chemical form other than metal, which is calculated from the above, is divided by the sum of the atomic concentrations of Cr present in the metal form and Fe present in the metal form to determine [chemical form other than metal (Cr+Fe)]/[metal form (Cr+Fe)]. Specifically, a 10 mm square sample is cut from the steel sheet, and the sample is measured with an X-ray photoelectron spectrometer (X-tool made by ULVAC-PHI) using an Al-Kα monochrome X-ray source at an extraction angle of 45 degrees. Then, the Cr and Fe peaks obtained from the measurement are separated into peaks present in the metal form and peaks present in the chemical form other than metal each for Cr and Fe. Then, the sum of the atomic concentrations of Cr present in the chemical form other than metal and Fe present in the chemical form other than metal, which is calculated from the above, is divided by the sum of the atomic concentrations of Cr present in the metal form and Fe present in the metal form to determine [chemical form other than metal (Cr+Fe)]/[metal form (Cr+Fe). The peak separation is performed by removing the background of the spectrum by Shirley method and using a Gauss-Lorentz complex function (proportion of Lorentz function: 30%).

In the stainless steel sheet for fuel cell separators according to one of the embodiments, the average grain size is preferably 10 μm or more, and the average grain size is preferably 40 μm or less.

Average Grain Size: 10 μm or More and 40 μm or Less

A stainless steel sheet as rolled that has not been annealed has a uniform, non-recrystallized deformed microstructure. When such a stainless steel sheet as rolled is subjected to a first immersion treatment described below, dissolution uniformly progresses in the stainless steel sheet. On the other hand, in a stainless steel sheet obtained by annealing the stainless steel sheet as rolled (hereinafter, also referred to as an annealed stainless steel sheet), the boundaries of respective recrystallized crystal grains (hereinafter, also referred to as a crystal grain boundaries) are the initiation points for dissolution. Therefore, when such an annealed stainless steel sheet is subjected to the first immersion treatment described below, dissolution non-uniformly progresses in the stainless steel sheet. When the dissolution of the stainless steel sheet non-uniformly progresses in the first immersion treatment, recessed parts and projected parts are likely to be formed on the surface of the stainless steel sheet from a stage with a smaller amount of dissolution, compared with the case when the dissolution uniformly progresses.

Based on the above insights, we further studied and found that the desired surface characteristics (Sa and Ssk) of the stainless steel sheet is obtained with a smaller amount of dissolution by appropriately controlling the size of the crystal grains in the stainless steel sheet, specifically, by controlling the average grain size to the range of 10 μm or more and 40 μm or less. If the amount of dissolution can be reduced, many advantages can be obtained, such as shorter treatment time (immersion time) in the first immersion treatment, lower treatment temperature, lower treatment liquid consumption, and lower cost of disposing used treatment liquid, as well as higher product yield rate.

Here, if the average grain size is 10 μm or more, a sufficient number of defects accumulate at the crystal grain boundaries, resulting in a larger difference in dissolution characteristics between the crystal grain boundaries and the inside of the crystal grains, and the reduction effect of the above amount of dissolution is preferably obtained. On the other hand, if the average grain size is more than 40 μm, the amount of crystal grain boundaries per unit area decreases, and the reduction effect of the above amount of dissolution is reduced. Therefore, the average grain size of the stainless steel foil is preferably 10 μm or more, and the average grain size of the stainless steel foil is preferably μm or less.

The average grain size of the stainless steel sheet is determined by electron backscatter diffraction (EBSD) analysis.

That is, the stainless steel sheet is embedded in resin and its surface is polished so that the cross section parallel to the rolling direction of the stainless steel sheet is exposed. Then, the EBSD analysis is performed to calculate the average grain size based on the Area Fraction method. The field of view area for performing the EBSD analysis is desirably 0.025 mm 2 or more. For example, for a stainless steel sheet with a thickness of 0.10 mm, the width of the field of view is desirably 0.25 mm or more. Other conditions may be in accordance with conventional methods. The grain size of each crystal grain is determined by calculating the equivalent circle diameter from the area of each crystal grain determined by the Area Fraction method.

The stainless steel sheet for fuel cell separators according to one of the embodiments is not particularly limited, but preferably has a chemical composition (hereinafter, also referred to as a "preferred chemical composition") containing, by mass %, C: 0.100% or less, Si: 2.00% or less, Mn: 3.00% or less, P: 0.050% or less, S: 0.010% or less, Cr: 15.0% or more and 25.0% or less, Ni: 0.01% or more and % or less, Al: 0.500% or less, and N: 0.100% or less, and optionally containing one or two or more selected from:

(a) Cu: 2.50% or less;

(b) Mo: 4.00% or less; and (c) one or two or more elements selected from Ti, Nb, and Zr: 1.00% or less in total, with the balance being Fe and inevitable impurities.

The reason for this is described below. In the following description, "%" regarding chemical compositions denotes mass % unless otherwise stated.

C: 0.100% or Less

C reacts with Cr in steel to precipitate as Cr carbides at grain boundaries. Therefore, C incurs a decrease in corrosion resistance. Therefore, in terms of the corrosion resistance, a lower C content is preferable, and the C content is preferably 0.100% or less. The C content is more preferably 0.060% or less. No particular lower limit is placed on the C content. However, the lower limit is preferably %.

Si: 2.00% or Less

Si is an element useful for deoxidization and added at a step of smelting steel. The effect is preferably obtained through a Si content of 0.01% or more. However, an excessive Si content hardens the steel and tends to decrease ductility. Therefore, the Si content is preferably 2.00% or less. The Si content is more preferably 1.00% or less.

Mn: 3.00% or Less

Mn is an element useful for deoxidation and added at a step of smelting steel. The effect is preferably obtained through a Mn content of 0.01% or more. If the Mn content is more than 3.00%, however, the corrosion resistance tends to decrease. Therefore, the Mn content is preferably 3.00% or less. The Mn content is more preferably 1.50% or less, and further preferably 1.00% or less.

P: 0.050% or Less

Because P incurs a decrease in ductility, the P content is desirably low. If the P content is 0.050% or less, however, the ductility does not decrease markedly. Therefore, the P content is preferably 0.050% or less. The P content is more preferably 0.040% or less. No particular lower limit is placed on the P content. However, excessive dephosphorization incurs higher cost. Therefore, the P content is preferably 0.010% or more.

S: 0.010% or Less

S is an element that combines with Mn to form MnS, decreasing corrosion resistance. If the S content is 0.010% or less, however, the corrosion resistance does not decrease markedly. Therefore, the S content is preferably 0.010% or less. No particular lower limit is placed on the S content. However, excessive desulfurization incurs higher cost. Therefore, the S content is preferably 0.001% or more.

Cr: 15.0% or More and 25.0% or Less

The Cr content is preferably 15.0% or more in order to ensure the corrosion resistance. That is, if the Cr content is less than 15.0%, the stainless steel sheet has difficulty in withstanding long-term use as a fuel cell separator in terms of the corrosion resistance. The Cr content is more preferably 18.0% or more. On the other hand, if the Cr content is more than 25.0%, a sufficient amount of etching may not be obtained. Therefore, the Cr content is preferably 25.0% or less. The Cr content is more preferably 23.0% or less, and further preferably 21.0% or less.

Ni: 0.01% or More and 30.0% or Less

Ni is an element useful for improving the corrosion resistance of stainless steel. Austenitic stainless steel or ferrite-austenite dual phase stainless steel generally contains a fixed amount of Ni. If the Ni content is more than 30.0%, however, hot workability decreases. Therefore, the Ni content is preferably 30.0% or less. The Ni content is more preferably 20.0% or less. Further, the Ni content is preferably or more.

The lower limit of the Ni content in austenitic stainless steel or ferrite-austenite dual phase stainless steel is preferably 2.00%. When ferritic stainless steel contains Ni, the Ni content is preferably 2.00% or less, and more preferably 1.00% or less. The lower limit of the Ni content in ferritic stainless steel is preferably 0.01%.

Al: 0.500% or Less

Al is an element used for deoxidation. The effect is preferably obtained through an Al content of 0.001% or more. If the Al content is more than 0.500%, however, the ductility may decrease. Therefore, the Al content is preferably 0.500% or less. The Al content is more preferably 0.010% or less, and further preferably 0.005% or less.

N: 0.100% or Less,

If the N content is more than 0.100%, formability decreases. Therefore, the N content is preferably 0.100% or less. The N content is more preferably 0.050% or less, and further preferably 0.030% or less. No particular lower limit is placed on the N content. However, excessive denitrogenation incurs higher cost. Therefore, the N content is preferably 0.002% or more.

In addition to the above components, the following additional components may be added.

Cu: 2.50% or Less

Cu is an element useful for promoting the formation of the austenite phase and improving the corrosion resistance of stainless steel. The effect is preferably obtained through a Cu content of 0.01% or more. If the Cu content is more than 2.50%, however, the hot workability decreases to incur a decrease in productivity. Therefore, when Cu is added, the Cu content is 2.50% or less. The Cu content is preferably 1.00% or less.

Mo: 4.00% or Less

Mo is an element useful for preventing local corrosion such as crevice corrosion of stainless steel. The effect is preferably obtained through a Mo content of 0.01% or more. If the Mo content is more than 4.00%, however, stainless steel embrittles. Therefore, when Mo is added, the Mo content is 4.00% or less. The Mo content is preferably 2.50% or less.

One or Two or More Elements Selected from Ti, Nb, and Zr: 1.00% or Less in Total Ti, Nb, and Zr contribute to improved intergranular corrosion resistance, and therefore these elements can be added alone or in combination. The effect is preferably obtained through a content of each element of 0.01% or more. If the total content of these elements is more than 1.00%, however, the ductility tends to decrease. Therefore, when Ti, Nb, and Zr are added, the total content of these elements is 1.00% or less. No particular lower limit is placed on the total content of Ti, Nb, and Zr. However, the total content of Ti, Nb, and Zr is preferably 0.01% or more.

The components other than those described above are Fe and inevitable impurities.

The stainless steel sheet for fuel cell separators according to one of the embodiments may be any one of a ferritic stainless steel sheet, an austenitic stainless steel sheet, and a ferrite-austenitic dual phase stainless steel sheet. However, from the viewpoint of workability, the austenitic stainless steel sheet is preferable. Here, the microstructure of the ferritic stainless steel sheet may be a single-phase microstructure of a ferrite phase, or it may contain precipitates with a volume fraction of 1% or less as the balance other than the ferrite phase. The microstructure of the austenitic stainless steel sheet may be a single-phase microstructure of an austenite phase, or it may contain precipitates with a volume fraction of 1% or less as the balance other than the austenite phase. The microstructure of the ferrite-austenite dual phase stainless steel sheet (hereinafter, also referred to as a dual phase stainless steel sheet) may consist of a ferrite phase and an austenite phase, or it may contain precipitates with a volume fraction of 1% or less as the balance other than the ferrite phase and the austenite phase. The above precipitates include, for example, one or two or more selected from the group consisting of intermetallic compounds, carbides, nitrides, and sulfides. The identification of each phase may be performed in accordance with conventional methods.

In view of the installation space and weight when stacking fuel cells, the thickness of the stainless steel sheet for fuel cell separators according to one of the embodiments is preferably in the range of 0.03 mm to 0.30 mm. If the sheet thickness is less than 0.03 mm, the production efficiency of a metal sheet material decreases. On the other hand, if the sheet thickness is more than 0.30 mm, the installation space and weight when stacking fuel cells increase. The thickness of the stainless steel sheet for fuel cell separators according to one of the embodiments is more preferably 0.05 mm or more. Further, the thickness of the stainless steel sheet for fuel cell separators according to one of the embodiments is more preferably 0.15 mm or less.

(2) Method of Producing Stainless Steel Sheet for Fuel Cell Separators

The following describes a method of producing a stainless steel sheet for fuel cell separators according to one of the embodiments.

[Preparation of Material Stainless Steel Sheet]

The preparation process is a process to prepare a stainless steel sheet to be used as a material (hereinafter, also referred to as a "material stainless steel sheet"). The method of preparing the material stainless steel sheet is not particularly limited. For example, a material stainless steel sheet having the above chemical composition may be prepared as follows.

That is, the material stainless steel sheet having the above chemical composition can be prepared by hot rolling a steel slab having the above chemical composition to obtain a hot-rolled sheet, optionally subjecting the hot-rolled sheet to hot-rolled sheet annealing and acid cleaning, thereafter, cold rolling the hot-rolled sheet to obtain a cold-rolled sheet with a desired sheet thickness, and further optionally subjecting the cold-rolled sheet to cold-rolled sheet annealing. Conditions for hot rolling, cold rolling, hot-rolled sheet annealing, cold-rolled sheet annealing, and the like are not particularly limited, and may be in accordance with conventional methods. After cold-rolled sheet annealing, the cold-rolled sheet may be subjected to acid cleaning and skin pass. Cold-rolled sheet annealing can also be bright annealing.

From the viewpoint of controlling the average grain size of the stainless steel sheet within a predetermined range, it is preferable to appropriately control the conditions of finish annealing, which is the final annealing in cold-rolled sheet annealing, in particular, the finish annealing temperature and the finish annealing time. For example, for the austenitic stainless steel sheet, it is preferable to control the finish annealing temperature in the range of 1050° C. to 1250° C. and the finish annealing time in the range of 20 seconds to 90 seconds. For the ferritic stainless steel sheet, it is preferable to control the finish annealing temperature in the range of 750° C. to 1050° C. and the finish annealing time in the range of 20 seconds to 90 seconds. The atmosphere for finish annealing is preferably a non-oxidizing atmosphere (e.g., a mixed atmosphere of $H_2$ and $N_2$ ($H_2$:$N_2$=75:25 by volume, dew point: −50° C.)).

[First Immersion Treatment (Etching Treatment)]

As the first immersion treatment, the material stainless steel sheet prepared as described above is subjected to immersion treatment (etching treatment) using an acidic aqueous solution containing: hydrogen peroxide of 0.1 mass % or more and 5.0 mass % or less, copper ion of 1.0 mass % or more and 10.0 mass % or less, and halide ion of mass % or more and 20.0 mass % or less, with pH of 1.0 or less, as a treatment solution, with a treatment temperature of 30° C. or more and 50° C. or less and a treatment time of 40 seconds or more and 120 seconds or less, respectively. Applying the etching treatment according to the above conditions enables to precisely control the amount of dissolution of the stainless steel sheet and, in turn, the shape of the textured structure formed on the steel sheet surface as described above. The following describes the etching treatment conditions. The amount of dissolution of the stainless steel sheet during the etching treatment varies depending on the type and temperature of the treatment solution used in the etching treatment, as well as the treatment time. Thus, it is important to appropriately control these conditions to achieve the desired surface characteristics (For example, because there are parts that are likely to dissolve and parts that are unlikely to dissolve on the steel sheet surface, the etching treatment forms recessed parts and projected parts on the steel sheet surface. However, if the amount of dissolution of stainless steel sheet is excessively high, etching proceeds even at the parts that are unlikely to dissolve on the steel sheet surface to make the projected parts (mountain parts) gentle, resulting in a negative value of Ssk). First, the preferred concentration of each component contained in the above treatment solution is described.

Hydrogen Peroxide: 0.1 Mass % or More and 5.0 Mass % or Less

If the concentration of hydrogen peroxide is less than 0.1 mass %, the power to remove copper-containing products precipitated on the steel sheet surface is reduced, making continuous etching treatment impossible. On the other hand, if the concentration of hydrogen peroxide is more than 5.0 mass %, the effect is saturated. Therefore, the concentration of hydrogen peroxide is preferably 0.1 mass % or more, and the concentration of hydrogen peroxide is preferably 5.0 mass % or less.

Copper Ion: 1.0 Mass % or More and 10.0 Mass % or Less

If the concentration of copper ions is less than 1.0 mass %, the etching power is reduced, making it impossible to form the predetermined textured structure shape on the steel sheet surface. On the other hand, if the concentration of copper ions is more than 10.0 mass %, more products adhere to the steel sheet surface, making it impossible to sufficiently remove the smut even with the second immersion treatment in the next process. Therefore, the concentration of copper ions is preferably 1.0 mass % or more, and the concentration of copper ions is preferably 10.0 mass % or less. The concentration of copper ions is preferably 2.0 mass % or more, and further preferably 5.0 mass % or more.

Halide Ion: 5.0 Mass % or More and 20.0 Mass % or Less

If the concentration of halide ions is less than 5.0 mass %, the passive film present on the surface of the stainless steel sheet cannot be sufficiently destroyed, making it possible to sufficiently progress etching. On the other hand, if the concentration of halide ions is more than 20.0 mass %, localized pitting corrosion may be accelerated to cause holes in the steel sheet. Therefore, the concentration of halide ions is preferably 5.0 mass % or more, and the concentration of halide ions is preferably 20.0 mass % or less. The concentration of halide ions is preferably 10.0 mass % or more. Further, the concentration of halide ions is preferably 15.0 mass % or less. The type of halide ion source is not particularly limited. However, for example, hydrogen halides or alkali metal halides are preferable, and hydrochloric acid or sodium chloride is more preferable.

pH: 1.0 or Less

If the pH of the treatment solution is more than 1.0, the etching power decreases, making it impossible to form the predetermined textured structure shape on the steel sheet surface. Therefore, the pH of the treatment solution is 1.0 or less. The pH of the treatment solution is desirably lower, and more preferably 0.1 or less.

The above aqueous solution can be prepared by uniformly stirring a hydrogen peroxide aqueous solution, a copper compound capable of supplying copper ions, a halide component capable of supplying halide ions, and water.

Treatment Temperature (Temperature of Treatment Solution): 30° C. or More and 50° C. or Less If the treatment temperature is less than 30° C., the etching force is reduced to incur an increase in treatment time. On the other hand, if the treatment temperature is more than 50° C., the stability of the treatment solution decreases. Therefore, the treatment temperature is 30° C. or more and 50° C. or less.

Treatment Time (Immersion Time): 40 Seconds or More and 120 Seconds or Less

If the treatment time is less than 40 seconds, a sufficient amount of etching cannot be obtained. On the other hand, if the treatment time is more than 120 seconds, making it impossible to form the predetermined textured structure shape on the steel sheet surface. This also reduces the productivity. Therefore, the treatment time is 40 seconds or more and 120 seconds or less. The amount of etching varies depending on the type of stainless steel. Thus, it is more preferable to adjust the treatment time within the range of 40 seconds to 120 seconds, depending on the type of steel.

Conditions other than the above are not particularly limited and may be in accordance with conventional methods. The above describes the treatment in which the material stainless steel sheet is immersed in the aqueous solution, a treatment solution. However, as long as the material stainless steel sheet contacts the aqueous solution, the above aqueous solution to be a treatment solution can be, for example, dropped or sprayed. In such a case, the treatment time is the contact time between the material stainless steel sheet and the aqueous solution.

[Second Immersion Treatment (Smut Removal Treatment)

After the above first immersion treatment, as the second immersion treatment, the material stainless steel sheet is further subjected to:

(A) immersion treatment using an acidic aqueous solution containing hydrogen peroxide, with a treatment temperature of 30° C. or more and 60° C. or less and a treatment time of 5 seconds or more and 120 seconds or less, respectively;

(B) immersion treatment using an aqueous solution containing nitric acid, with a treatment temperature of 30°

C. or more and 60° C. or less and a treatment time of 5 seconds or more and 120 seconds or less, respectively; or (C) treatment combining (A) and (B) above. This can dissolve (remove) the smut formed during the first immersion treatment (etching treatment).

That is, if (a mixture of C, N, S, O, Fe, Cr, Ni, and Cu as major constituent elements with high electrical resistance) is formed and remain on the surface of the stainless steel sheet after the first immersion treatment, it may cause an increase in contact resistance even if the desired textured structure is obtained. In this regard, after the above first immersion treatment, performing immersion treatment in the above acidic aqueous solution containing hydrogen peroxide or solution containing nitric acid can remove the above smut to obtain the contact resistance reduction effect.

Here, the acidic aqueous solution containing hydrogen peroxide is a mixed aqueous solution of hydrogen peroxide and sulfuric acid. The solution containing nitric acid is a nitric acid aqueous solution.

When the mixed aqueous solution of hydrogen peroxide and sulfuric acid is used, the concentration of hydrogen peroxide is preferably 0.5 mass % or more and the concentration of sulfuric acid is preferably 1.0 mass % or more, and the concentration of hydrogen peroxide is preferably 10.0 mass % or less and the concentration of sulfuric acid is preferably 10.0 mass % or less. Furthermore, when the nitric acid aqueous solution is used, the concentration of nitric acid is preferably 1.0 mass % or more, and the concentration of nitric acid is preferably 40.0 mass % or less. The component other than hydrogen peroxide and sulfuric acid in the mixed aqueous solution of hydrogen peroxide and sulfuric acid, and the component other than nitric acid in the nitric acid aqueous solution, are basically water.

Furthermore, the treatment temperature (temperature of the treatment solution) in the second immersion treatment is preferably 30° C. or more and the treatment temperature (temperature of the treatment solution) in the second immersion treatment is preferably 60° C. or less, in any cases of (A) to (C) above.

In addition, a longer treatment time (immersion time) promotes smut removal. However, a too long treatment time (immersion time) saturates the effect to reduce the productivity. Therefore, the treatment time is preferably 5 seconds or more and the treatment time is preferably 120 seconds or less, in any cases of (A) to (C) above. The treatment time is more preferably 30 seconds or more. The treatment time is more preferably 90 seconds or less.

In addition, as in (B) or (C) above, performing the immersion treatment using an aqueous solution containing nitric acid can more effectively dissolve (remove) the smut formed during the first immersion treatment (etching treatment), thereby further enhancing the contact resistance reduction effect.

During the second immersion treatment, if necessary, scrubbing the surface of the stainless steel sheet as a treated material with a non-woven fabric wiper or the like facilitates the removal of smut, which will stably obtain further contact resistance reduction effect. The above describes the treatment in which the material stainless steel sheet is immersed in the aqueous solution, a treatment solution. However, as long as the material stainless steel sheet contacts the aqueous solution, the above aqueous solution to be a treatment solution can be, for example, dropped or sprayed. In such a case, the treatment time is the contact time between the material stainless steel sheet and the aqueous solution. Other than continuous treatment on the steel strip, the second immersion treatment may be applied after the stainless steel sheet is processed into a separator shape.

Others

After the above first immersion treatment or second immersion treatment, a surface-coating layer may be further formed on the steel sheet surface. The surface-coating layer to be formed is not particularly limited. However, it is preferable to use a material that has excellent corrosion resistance and conductivity in the fuel cell separator use environment. For example, it is preferable to use a metal layer, an alloy layer, a metal oxide layer, a metal carbide layer, a metal nitride layer, a carbon material layer, a conductive polymer layer, an organic resin layer containing a conductive substance, or a mixed layer thereof.

Examples of the metal layer include metal layers of Au, Ag, Cu, Pt, Pd, W, Sn, Ti, Al, Zr, Nb, Ta, Ru, Ir, and Ni. A metal layer of Au or Pt is particularly preferable.

Examples of the alloy layer include Sn alloy layers of Ni—Sn ($Ni_3Sn_2$, $Ni_3Sn_4$), Cu—Sn ($Cu_3Sn$, $Cu_6Sn_5$), Fe—Sn (FeSn, $FeSn_2$), Sn—Ag, and Sn—Co, and alloy layers of Ni—W, Ni—Cr, and Ti—Ta. An alloy layer of Ni—Sn or Fe—Sn is particularly preferable.

Examples of the metal oxide layer include metal oxide layers of $SnO_2$, $ZrO_2$, $TiO_2$, $WO_3$, $SiO_2$, $Al_2O_3$, $Nb_2O_5$, $IrO_2$, $RuO_2$, $PdO_2$, $Ta_2O_5$, $Mo_2O_5$, and $Cr_2O_3$. A metal oxide layer of $TiO_2$ or $SnO_2$ is particularly preferable.

Examples of the metal nitride layer and the metal carbide layer include metal nitride layers and metal carbide layers of TiN, CrN, TiCN, TiAlN, AlCrN, TiC, WC, SiC, $B_4C$, molybdenum nitride, CrC, TaC, and ZrN. A metal nitride layer of TiN is particularly preferable.

Examples of the carbon material layer include carbon material layers of graphite, amorphous carbon, diamond-like carbon, carbon black, fullerene, and carbon nanotube. A carbon material layer of graphite or diamond-like carbon is particularly preferable.

Examples of the conductive polymer layer include conductive polymer layers of polyaniline and polypyrrole.

In addition, the organic resin layer containing a conductive substance contains at least one of conductive substances selected from metals, alloys, metal oxides, metal nitrides, metal carbides, carbon materials, or conductive polymers that constitute the above metal layer, alloy layer, metal oxide layer, metal nitride layer, metal carbide layer, carbon material layer, and conductive polymer layer, and contains at least one of organic resins selected from an epoxy resin, a phenol resin, a polyamide-imide resin, a polyester resin, a polyphenylene sulfide resin, a polyamide resin, a urethane resin, an acrylic resin, a polyethylene resin, a polypropylene resin, a carbodiimide resin, or a phenol epoxy resin. As such an organic resin layer containing a conductive substance, for example, a graphite-dispersed phenol resin or a carbon black-dispersed epoxy resin is preferable.

As the above conductive substance, a metal and a carbon material (in particular, graphite, carbon black) are preferable. The content of the conductive substance is not particularly limited, as long as predetermined conductivity is obtained in a separator for polymer electrolyte fuel cells.

Examples of the above mixed layer include a mixed layer of a TiN-dispersed Ni—Sn alloy.

The above treatment may be performed after the stainless steel sheet is processed into a separator shape.

EXAMPLES

Example 1

Material stainless steel sheets (obtained by bright annealing after cold rolling) with a thickness of 0.10 mm having the chemical compositions of Steel No. A to G presented in Table 1 (the balance being Fe and inevitable impurities) were prepared. The prepared stainless steel sheets were then subjected to the first immersion treatment (etching treatment) and the second immersion treatment (smut removal treatment) under the conditions presented in Tables 2 and 3 to obtain stainless steel sheets for fuel cell separators. In the above treatment, after the second immersion treatment, the stainless steel sheets were immersed in pure water to stop the reaction.

Etching Treatment Solution A1

Hydrogen peroxide: 0.2 mass %
Copper ion: 1.5 mass %
Chloride ion: 10.0 mass %
Balance: water
pH: 0.05

The copper ion and the chloride ion are derived from copper sulfate pentahydrate and hydrochloric acid, respectively.

Etching Treatment Solution A2

Hydrogen peroxide: 0.3 mass %
Copper ion: 2.0 mass %
Chloride ion: 15.0 mass %
Balance: water
pH: 0.05

The copper ion and the chloride ion are derived from copper sulfate pentahydrate and hydrochloric acid, respectively.

Etchant Treatment Solution A3

Hydrogen peroxide: 0.3 mass %
Copper ion: 9.0 mass %
Chloride ion: 10.0 mass %
Balance: water
pH: 0.05

The copper ion and the chloride ion are derived from copper sulfate pentahydrate and hydrochloric acid, respectively.

Etching Treatment A4

Hydrogen peroxide: 2.0 mass %
Copper ion: 2.0 mass %
Chloride ion: 10.0 mass %
Balance: water
pH: 0.05

The copper ion and the chloride ion are derived from copper sulfate pentahydrate and hydrochloric acid, respectively.

Smut Removal Treatment Solution B1

Hydrogen peroxide: 3.0 mass %
Sulfuric acid: 6.0 mass %
Balance: water

Smut Removal Treatment Solution B2

Hydrogen peroxide: 2.0 mass %
Sulfuric acid: 4.0 mass %
Balance: water

Smut Removal Treatment Solution N1

Nitric acid: 30 mass %
Balance: water

The thus obtained stainless steel sheets for fuel cell separators were measured for Sa and Ssk in accordance with ISO 25178. A laser microscope (VK-X250/X260 made by Keyence) was used for the measurements. Specifically, a test specimen was taken from each of the stainless steel sheets for fuel cell separators, and the surface profile data of a 50 μm×50 μm area on each side of the test specimen was measured with the above laser microscope using an objective lens with a magnification of 150×. The obtained data was analyzed using analysis software "Multi-file Analysis Application" provided with the device to obtain Sa and Ssk on each side of the test specimen. Before analyzing Sa and Ssk, the image was processed by removing and interpolating areas where the light intensity was outside the threshold range (0.00 to 99.5), smoothing with a Gaussian function and setting a cut level to remove noise and the like. Then, a plane was set as the reference plane for measurement by reference plane setting, and the curved surface was corrected to a plane by quadratic surface correction. The filter type was Gaussian, and the cutoff wavelength specified by the S-filter was 0.5 μm. The measurement results are presented in Tables 2 and 3. The values of Sa and Ssk were almost the same on both sides for any test specimens. Thus, the values of Sa and Ssk measured on one side of the test specimen are representatively presented in Tables 2 and 3. For reference, the steel sheet of Steel No. B in Table 1 as the material stainless steel sheet was subjected to electrolytic treatment using 10 mass % sulfuric acid, under a set of conditions including −1 mA/cm$^2$×90 seconds, and +0.03 mA/cm$^2$×90 seconds. When the values of Sa and Ssk of the steel sheet after the treatment were measured, Sa was 0.14 μm and Ssk was 0.90.

For each of Sample Nos. 13 to 21, [chemical form other than metal (Cr+Fe)]/[metal form (Cr+Fe)] was calculated by the method described above. The results are presented in Table 3. Each chemical composition of the finally obtained stainless steel sheets for fuel cell separators was substantially the same as the chemical composition of each Steel No. presented in Table 1, and each satisfied the above range of preferred chemical compositions.

Furthermore, the obtained stainless steel sheets for fuel cell separators were used to evaluate the contact resistance in the following manner.

Evaluation of Contact Resistance

From the stainless steel sheets for fuel cell separators obtained as described above, predetermined samples were cut. Each sample was then sandwiched between carbon papers (TGP-H-120 made by Toray Industries, Inc.), and brought into contact with electrodes obtained by gold-plating copper sheets, from both sides. A pressure of 0.98 MPa (=10 kg/cm$^2$) per unit area was applied to the sample to pass electric current. The voltage difference between the electrodes was then measured to calculate the electrical resistance. The measured electrical resistance was multiplied by the area of the contact surface and divided by 2. Further, the value obtained by subtracting the internal resistance of the carbon paper (3 mΩ·cm$^2$) from that value was set as a contact resistance value ([contact resistance value (mΩ·cm$^2$)]={[measured electrical resistance (mΩ))]×[area of contact surface (cm$^2$)]/2}−3), and the contact resistance was evaluated based on the following criteria. The evaluation results are presented in Tables 2 and 3.

◎ (pass, particularly good): 5 mΩ·cm$^2$ or less
○ (pass): more than 5 mΩ·cm$^2$ and 10 mΩ·cm$^2$ or less
x (fail): more than 10 mΩ·cm$^2$ Evaluation of Corrosion Resistance (Stability in Separator Use Environment)

From the stainless steel sheets for fuel cell separators obtained as described above, predetermined samples were cut. Each sample was then immersed in a sulfuric acid aqueous solution containing 0.1 ppm hydrofluoric acid with pH of 3.0 and a temperature of 80° C. The sample was then held in the sulfuric acid aqueous solution for 25 hours at a potential of 0.6 V, which simulates the separator use environment, and the current density value was measured after 25 hours. Ag/AgCl (saturated KCl) was used as the reference electrode. Then, based on the measured current density value after 25 hours, the corrosion resistance after 25 hours in the separator use environment (stability in the separator use environment) was evaluated based on the following criteria. The evaluation results are presented in Tables 2 and 3.

○ (pass): 1 μA/cm$^2$ or less
x (fail): more than 1 μA/cm$^2$

TABLE 1

| Steel | Chemical composition (mass %) | | | | | | | | | | | |
|---|---|---|---|---|---|---|---|---|---|---|---|---|
| No. | C | Si | Mn | P | S | Cr | Ni | Al | N | Cu | Mo | Others | Remarks |
| A | 0.039 | 0.61 | 0.90 | 0.031 | 0.003 | 18.07 | 8.12 | 0.001 | 0.038 | — | — | — | Austenitic stainless steel sheet |
| B | 0.041 | 0.54 | 0.92 | 0.033 | 0.004 | 18.19 | 8.06 | 0.001 | 0.041 | 0.19 | 0.17 | — | Austenitic stainless steel sheet |
| C | 0.017 | 0.71 | 0.98 | 0.027 | 0.003 | 17.35 | 12.1 | 0.001 | 0.034 | 0.34 | 2.10 | — | Austenitic stainless steel sheet |
| D | 0.021 | 0.53 | 0.83 | 0.033 | 0.005 | 18.25 | 8.33 | 0.001 | 0.037 | — | — | Ti: 0.14, Nb: 0.22, Zr: 0.05 | Austenitic stainless steel sheet |
| E | 0.032 | 0.70 | 1.00 | 0.026 | 0.003 | 19.12 | 13.4 | 0.003 | 0.033 | 0.39 | — | — | Austenitic stainless steel sheet |
| F | 0.027 | 0.68 | 0.99 | 0.027 | 0.003 | 20.90 | 17.9 | 0.009 | 0.031 | 0.37 | — | — | Austenitic stainless steel sheet |
| G | 0.005 | 0.31 | 0.16 | 0.026 | 0.001 | 19.19 | 0.26 | 0.008 | 0.007 | — | 1.83 | Nb: 0.35 | Ferritic stainless steel sheet |
| H | 0.006 | 0.12 | 0.15 | 0.031 | 0.001 | 21.2 | 0.15 | 0.032 | 0.007 | 0.45 | — | Ti: 0.32 | Ferritic stainless steel sheet |

TABLE 2

| | | Production conditions | | | | | |
|---|---|---|---|---|---|---|---|
| | | First immersion treatment (Etching treatment) | | | Second immersion treatment (Smut removal treatment) | | |
| Sample No. | Steel No. | Treatment solution | Treatment temperature (° C.) | Treatment time (sec) | Treatment solution | Treatment temperature (° C.) | Treatment time (sec) |
| 1 | A | A1 | 35 | 75 | B1 | 40 | 60 |
| 2 | B | — | — | — | — | — | — |
| 3 | | A1 | 35 | 30 | B1 | 40 | 60 |
| 4 | | A1 | 35 | 45 | B1 | 40 | 60 |
| 5 | | A1 | 35 | 75 | B1 | 40 | 60 |
| 6 | | A1 | 35 | 105 | B1 | 40 | 60 |
| 7 | | A1 | 35 | 135 | B1 | 40 | 60 |
| 8 | C | A2 | 45 | 120 | B1 | 40 | 60 |
| 9 | D | A1 | 35 | 75 | B1 | 40 | 60 |
| 10 | E | A3 | 40 | 75 | B2 | 35 | 90 |
| 11 | F | A4 | 40 | 105 | B2 | 35 | 60 |
| 12 | G | A2 | 40 | 90 | B2 | 35 | 30 |

| | Evaluation results | | | | | |
|---|---|---|---|---|---|---|
| | | | Contact resistance | | | |
| Sample No. | Arithmetic mean height Sa (μm) | Skewness Ssk | Contact resistance value (mΩ · $cm^2$) | Determination | Corrosion resistance | Remarks |
| 1 | 0.38 | 0.48 | 6.6 | ○ | ○ | Example |
| 2 | 0.03 | −0.30 | >1000 | X | ○ | Comparative Example |
| 3 | 0.30 | −0.54 | 12.5 | X | ○ | Comparative Example |
| 4 | 0.32 | 0.03 | 6.4 | ○ | ○ | Example |
| 5 | 0.30 | 0.54 | 6.4 | ○ | ○ | Example |
| 6 | 0.28 | 0.19 | 8.4 | ○ | ○ | Example |
| 7 | 0.35 | −0.26 | 20.1 | X | ○ | Comparative Example |
| 8 | 0.27 | 0.36 | 7.8 | ○ | ○ | Example |
| 9 | 0.35 | 0.48 | 6.4 | ○ | ○ | Example |
| 10 | 0.32 | 0.54 | 6.2 | ○ | ○ | Example |
| 11 | 0.29 | 0.41 | 7.1 | ○ | ○ | Example |
| 12 | 0.43 | 0.27 | 8.9 | ○ | ○ | Example |

TABLE 3

| | | Production conditions | | | | | | | | |
|---|---|---|---|---|---|---|---|---|---|---|
| | | First immersion treatment (Etching treatment) | | | Second immersion treatment (Smut removal treatment) | | | | | |
| | | | | | First time | | | Second time | | |
| Sample No. | Steel No. | Treatment solution | Treatment temperature (° C.) | Treatment time (sec) | Treatment solution | Treatment temperature (° C.) | Treatment time (sec) | Treatment solution | Treatment temperature (° C.) | Treatment time (sec) |
| 13 | A | A1 | 35 | 75 | B1 | 40 | 60 | N1 | 55 | 60 |
| 14 | B | A1 | 35 | 75 | B1 | 40 | 60 | — | — | — |
| 15 | | A1 | 35 | 75 | N1 | 55 | 60 | — | — | — |
| 16 | | A1 | 35 | 75 | B1 | 40 | 60 | N1 | 55 | 60 |
| 17 | C | A2 | 45 | 120 | B1 | 40 | 60 | N1 | 55 | 30 |
| 18 | D | A1 | 35 | 75 | B1 | 40 | 60 | N1 | 55 | 60 |
| 19 | E | A3 | 40 | 75 | B2 | 35 | 60 | N1 | 55 | 60 |
| 20 | F | A4 | 40 | 105 | B2 | 35 | 60 | N1 | 55 | 90 |
| 21 | G | A2 | 40 | 90 | B2 | 35 | 60 | N1 | 55 | 60 |

| | | | | Evaluation results | | | |
|---|---|---|---|---|---|---|---|
| | | | | Contact resistance | | | |
| Sample No. | Arithmetic mean height Sa (μm) | Skewness Ssk | [chemical form other than metal (Cr + Fe)]/[metal form (Cr + Fe) | Contact resistance value (mΩ · cm$^2$) | Determination | Corrosion resistance | Remarks |
| 13 | 0.39 | 0.50 | 4.7 | 4.3 | ◎ | ○ | Example |
| 14 | 0.30 | 0.54 | 8.4 | 6.4 | ○ | ○ | Example |
| 15 | 0.32 | 0.60 | 4.9 | 4.2 | ◎ | ○ | Example |
| 16 | 0.31 | 0.57 | 4.6 | 4.1 | ◎ | ○ | Example |
| 17 | 0.29 | 0.37 | 4.8 | 4.7 | ◎ | ○ | Example |
| 18 | 0.36 | 0.49 | 4.5 | 4.2 | ◎ | ○ | Example |
| 19 | 0.35 | 0.57 | 4.4 | 4.0 | ◎ | ○ | Example |
| 20 | 0.30 | 0.43 | 4.2 | 4.5 | ◎ | ○ | Example |
| 21 | 0.46 | 0.29 | 4.3 | 4.9 | ◎ | ○ | Example |

From Tables 2 and 3, the following matters are clear.

(a) In all of Examples, the desired low contact resistance was obtained. In addition, good corrosion resistance (stability in the separator use environment) was obtained.

(b) A particularly low contact resistance was obtained in Example where an aqueous solution containing nitric acid was used, as the second immersion treatment.

(c) On the other hand, the desired low contact resistance could not be obtained in all of Comparative Examples.

Example 2

For Steel Nos. B and H in Table 1, material stainless steel sheets as cold rolled with a thickness of 0.10 mm were prepared. After cold rolling, some of the material stainless steel sheets were further subjected to finishing annealing in a mixed atmosphere of $H_2$ and $N_2$ ($H_2$:$N_2$=75:25 by volume, dew point: −50° C.) under the conditions presented in Table 4.

Then, after measuring the thickness of each of these material stainless steel sheets with a micrometer, the first immersion treatment (etching treatment) and the second immersion treatment (smut removal treatment) were applied under the conditions presented in Table 4 to obtain stainless steel sheets for fuel cell separators. The treatment solutions A1 and N1 in Table 4 are the same as those used in Example 1. In the above treatment, after the second immersion treatment, the stainless steel sheets were immersed in pure water to stop the reaction.

The thickness of each of the thus obtained stainless steel sheets for fuel cell separators was measured with a micrometer. The thickness reduction quantity due to the immersion treatment was then calculated by subtracting the thickness of the stainless steel sheet for fuel cell separators measured after the immersion treatment from the thickness of the material stainless steel sheet measured before the immersion treatment. Sa and Ssk were also measured in the same manner as in Example 1. In addition, the average grain size was measured in the above manner. The measurement results are presented in Table 4. “Unmeasurable” in the column of Average grain size in Table 4 means that no crystal grain boundaries were observed in the electron backscatter diffraction (EBSD) analysis and the average grain size could not be measured. The same manner as in Example 1 was used to calculate [chemical form other than metal (Cr+Fe)]/[metal form (Cr+Fe)]. The results are presented in Table 4. Each chemical composition of the finally obtained stainless steel sheets for fuel cell separators was substantially the same as the chemical composition of each Steel No. presented in Table 1, and each satisfied the above range of preferred chemical compositions.

The above stainless steel sheets for fuel cell separators were evaluated for (1) contact resistance and (2) corrosion resistance in the same manner as in Example 1. The evaluation results are presented in Table 4.

TABLE 4

| Sample No. | Steel No. | Final annealing Temperature (° C.) | Final annealing Time (sec) | Production conditions: First immersion treatment (Etching treatment) Treatment solution | Treatment temperature (° C.) | Treatment time (sec) | Second immersion treatment (Smut removal treatment) Treatment solution | Treatment temperature (° C.) | Treatment time (sec) | Thickness reduction quantity by immersion treatment (μm) |
|---|---|---|---|---|---|---|---|---|---|---|
| 2-1 | B | None | | A1 | 35 | 90 | N1 | 55 | 60 | 35 |
| 2-2 | B | None | | A1 | 35 | 120 | NI | 55 | 60 | 50 |
| 2-3 | B | 1100 | 45 | A1 | 35 | 45 | N1 | 55 | 60 | 14 |
| 2-4 | B | 1200 | 45 | A1 | 35 | 45 | N1 | 55 | 60 | 13 |
| 2-5 | H | None | | A1 | 35 | 90 | N1 | 55 | 60 | 36 |
| 2-6 | H | None | | A1 | 35 | 120 | N1 | 55 | 60 | 48 |
| 2-7 | H | 800 | 45 | A1 | 35 | 45 | N1 | 55 | 60 | 13 |
| 2-8 | H | 950 | 45 | A1 | 35 | 45 | N1 | 55 | 60 | 12 |
| | | | | | | | | | | |
| **Sample No.** | **Arithmetic mean height Sa (μm)** | **Skewness Ssk** | **[chemical form other than metal (Cr + Fe)]/[metal form (Cr + Fe)** | **Average grain size (μm)** | **Evaluation results: Contact resistance value ($m\Omega \cdot cm^2$)** | **Contact resistance Determination** | **Corrosion resistance** | **Remarks** | | |
| 2-1 | 0.18 | 0.08 | 4.3 | Unmeasurable | 6.5 | ○ | ○ | Example | | |
| 2-2 | 0.23 | 0.26 | 4.2 | Unmeasurable | 4.2 | ◎ | ○ | Example | | |
| 2-3 | 0.32 | 0.60 | 4.2 | 21 | 4.2 | ◎ | ○ | Example | | |
| 2-4 | 0.22 | 0.18 | 4.3 | 38 | 4.8 | ◎ | ○ | Example | | |
| 2-5 | 0.17 | 0.04 | 4.3 | Unmeasurable | 7.7 | ○ | ○ | Example | | |
| 2-6 | 0.25 | 0.22 | 4.5 | Unmeasurable | 4.3 | ◎ | ○ | Example | | |
| 2-7 | 0.20 | 0.25 | 4.4 | 12 | 4.1 | ◎ | ○ | Example | | |
| 2-8 | 0.45 | 0.58 | 4.4 | 28 | 4.1 | ◎ | ○ | Example | | |

As presented in Table 4, in all of Examples, the desired low contact resistance was obtained. In addition, good corrosion resistance was obtained.

In particular, in all of Sample Nos. 2-3, 2-4, 2-7, and 2-8, with an average grain size of 10 μm or more and 40 μm or less, the amount of dissolution of the stainless steel sheet in the first immersion treatment was reduced, while a particularly low contact resistance was obtained.

The invention claimed is:

1. A stainless steel sheet for fuel cell separators, comprising a chemical composition containing, by mass %, C: 0.100% or less;
Si: 2.00% or less;
Mn: 3.00% or less;
P: 0.050% or less;
S: 0.010% or less;
Cr: 15.0% or more and 23.0% or less;
Ni: 0.01% or more and 30.0% or less;
Al: 0.500% or less; and
N: 0.100% or less, with the balance being Fe and inevitable impurities, wherein the stainless steel sheet has a parameter Sa specified in ISO 25178 of 0.15 μm or more and 0.50 μm or less and a parameter Ssk specified in ISO 25178 of more than 0, and an average grain size is 10 μm or more and 40 μm or less.

2. The stainless steel sheet for fuel cell separators according to claim 1, wherein the parameter Sa specified in ISO 25178 is 0.20 μm or more and 0.48 μm or less.

3. The stainless steel sheet for fuel cell separators according to claim 1, wherein [chemical form other than metal (Cr+Fe)]/[metal form (Cr+Fe)] is 8.0 or less, where [chemical form other than metal (Cr+Fe)]/[metal form (Cr+Fe)] is the ratio of the total Cr and Fe present in the chemical form other than metal to the total Cr and Fe present in the metal form on the steel sheet surface.

4. The stainless steel sheet for fuel cell separators according to claim 1, wherein the chemical composition further contains, by mass %, one or two or more selected from the group consisting of Cu: 2.50% or less;
Mo: 4.00% or less; and
one or two or more elements selected from Ti, Nb, and Zr: 1.00% or less in total.

5. The stainless steel sheet for fuel cell separators according to claim 2, wherein [chemical form other than metal (Cr+Fe)]/[metal form (Cr+Fe)] is 8.0 or less, where [chemical form other than metal (Cr+Fe)]/[metal form (Cr+Fe)] is the ratio of the total Cr and Fe present in the chemical form other than metal to the total Cr and Fe present in the metal form on the steel sheet surface.

* * * * *